United States Patent

Szabo et al.

[11] Patent Number: 5,863,077
[45] Date of Patent: Jan. 26, 1999

[54] QUICK CONNECTOR WITH SNAP-ON FRANGIBLE RETAINER

[75] Inventors: George Szabo, Ortonville; Tim M. Dangel, Commerce Township, both of Mich.

[73] Assignee: ITT Automotive, Inc., Auburn Hills, Mich.

[21] Appl. No.: 771,066

[22] Filed: Dec. 20, 1996

[51] Int. Cl.[6] .................................................. F16L 35/00
[52] U.S. Cl. ................................... 285/3; 285/4; 285/93; 285/921
[58] Field of Search ........................... 285/3, 4, 93, 325, 285/319, 921

[56] References Cited

U.S. PATENT DOCUMENTS

| 1,121,847 | 12/1914 | Kirkwood | 285/3 X |
|---|---|---|---|
| 1,298,878 | 4/1919 | Brown . | |
| 1,893,979 | 1/1933 | Barrere . | |
| 2,021,241 | 11/1935 | Mall | 285/305 X |
| 2,423,726 | 7/1947 | Prata | 285/170 |
| 3,245,702 | 4/1966 | Smith | 285/305 |
| 3,794,057 | 2/1974 | Badger | 137/68 |
| 4,022,496 | 5/1977 | Crissy et al. | 285/3 |
| 4,423,892 | 1/1984 | Bartholomew | 285/319 |
| 4,431,218 | 2/1984 | Paul, Jr. et al. | 285/305 |
| 4,433,861 | 2/1984 | Kreczik | 285/305 |
| 4,524,995 | 6/1985 | Bartholomew | 285/54 |
| 4,526,411 | 7/1985 | Bartholomew | 285/305 |
| 4,561,682 | 12/1985 | Tisserat | 285/305 |
| 4,591,192 | 5/1986 | Van Exel et al. | 285/83 |
| 4,650,221 | 3/1987 | Caillouet, Jr. | 285/87 |
| 4,787,770 | 11/1988 | Lewis | 403/317 |
| 4,792,163 | 12/1988 | Kulle | 285/88 |
| 4,869,534 | 9/1989 | Ketcham et al. | 285/24 |
| 4,874,174 | 10/1989 | Kojima et al. | 285/82 |
| 4,913,467 | 4/1990 | Washizu | 285/39 |
| 4,925,217 | 5/1990 | Ketcham | 285/93 |
| 4,936,544 | 6/1990 | Bartholomew | 251/149.6 |
| 4,946,205 | 8/1990 | Washizu | 285/319 |
| 4,948,175 | 8/1990 | Bartholomew | 285/39 |
| 5,016,922 | 5/1991 | Le Mer et al. | 285/81 |
| 5,069,424 | 12/1991 | Dennany, Jr. et al. | 251/149.6 |
| 5,102,313 | 4/1992 | Szabo | 417/572 |
| 5,152,555 | 10/1992 | Szabo | 285/93 |
| 5,178,424 | 1/1993 | Klinger | 285/319 |
| 5,213,376 | 5/1993 | Szabo | 285/39 |
| 5,226,679 | 7/1993 | Klinger | 285/93 |
| 5,275,443 | 1/1994 | Klinger | 285/82 |
| 5,277,402 | 1/1994 | Szabo | 251/149.6 |

(List continued on next page.)

FOREIGN PATENT DOCUMENTS

| 488844 | 6/1992 | European Pat. Off. . | |
|---|---|---|---|
| 0 547 489 A1 | 6/1993 | European Pat. Off. | 285/3 |
| 3739745 | 11/1988 | Germany . | |
| 1317266 | 6/1987 | Russian Federation . | |
| 1404747 | 6/1988 | Russian Federation . | |
| 2087021 | 5/1982 | United Kingdom . | |
| 9315349 | 4/1993 | WIPO . | |

*Primary Examiner*—Eric K. Nicholson
*Assistant Examiner*—Greg Binda
*Attorney, Agent, or Firm*—Thomas N. Twomey

[57] ABSTRACT

A retainer for releasably locking the male and female components of a quick connector. The retainer is releasably insertible into a transverse bore in the female component and is blocked from full insertion by a projection. An extension projects from the retainer and has an aperture sized to receive the tip end of the male component, but not a radial flange on the male component when the retainer is partially inserted into the female component. Forced insertion of the male component breaks off a ring portion of the extension thereby enabling the radial flange on the male component to fully move into the female component. The retainer can then be urged into the fully latched position locking the male and female components. Lock projections on the retainer engage grooves in the bore in the female component to releasably lock the retainer in a partially inserted, shipping position in the female component and engage exterior lock surfaces on the housing on full insertion of the retainer to lock the retainer to the female component.

16 Claims, 3 Drawing Sheets

U.S. PATENT DOCUMENTS

| | | | |
|---|---|---|---|
| 5,297,818 | 3/1994 | Klinger | 285/93 |
| 5,348,353 | 9/1994 | Deweerdt | 285/305 |
| 5,354,102 | 10/1994 | Carman | 285/81 |
| 5,360,237 | 11/1994 | Carman et al. | 285/81 |
| 5,401,063 | 3/1995 | Plosz | 285/81 |
| 5,405,175 | 4/1995 | Bonnah, II et al. | 285/305 |
| 5,423,577 | 6/1995 | Ketcham | 285/305 |
| 5,452,924 | 9/1995 | Kujawski | 285/305 |
| 5,542,716 | 8/1996 | Szabo | 285/305 |
| 5,683,117 | 11/1997 | Corbett et al. | 285/319 X |

QUICK CONNECTOR WITH SNAP-ON FRANGIBLE RETAINER

BACKGROUND OF THE INVENTION

1. Field of the Invention

The present invention relates, in general, to quick connectors and, more specifically, to quick connectors including an internal retainer and means providing an indication of complete coupling between the male and female elements of the quick connector.

2. Description of the Art:

Snap-fit or quick connectors are employed in a wide range of applications, particularly, for joining fluid carrying conduits in automotive and industrial application. In a typical quick connector, a retainer is fixedly mounted within a bore in a housing of a female connector component or element. The retainer has a plurality of radially extending legs which extend inwardly toward the axial center line of the bore in the housing. A tube or fitting to be sealingly mounted in the bore in the female component includes a radially upset portion or flange which abuts an inner peripheral surface of the retainer legs. Seal and spacer members as well as a bearing or top head are typically mounted in the bore ahead of the retainer to form a seal between the housing and the male fitting when the male fitting is lockingly engaged with the retainer legs.

While such a retainer is usually effective in releasably coupling the male and female elements of a quick connector, it is possible that the male fitting may be partially, but not fully seated or coupled to the internal seal elements in the bore of the female component and not fully locked in position by the retainer legs. In this partially engaged position, the male fitting may work itself free of the housing thereby leading to leaks in the fluid delivery system.

As it is desirable to ensure that the male and female elements are fully coupled to prevent leaks, various indicators have been provided to indicate a full coupling or seating of the male fitting in the female element. In one type of indicator shown in U.S. Pat. No. 4,925,217, a deformable member is assembled within the fitting which includes elongated members extending out of the housing between the male and female elements prior to coupling and which are retracted, and no longer visible, once the coupling has been fully accomplished. The annular member in this device remains in assembly with the quick connector and contributes to component count, tolerance stack-up and possible misassembly. Furthermore, the elongated members which are visible during non-coupling of the connector are, by design, not visible after coupling is fully effected. In many applications, such as an extremely crowded engine compartment of a motor vehicle, the installed coupling may be difficult to see and inspect closely. Thus, the inability to see the elongated members from a distance or from an awkward position will not result in a high degree of confidence that the coupling has in fact fully taken place.

Other types of visual indicators, as shown in U.S. Pat. No. 4,946,205, are removable after full coupling of the male and female quick connector elements. However, the indicator disclosed in this patent is complex and add considerable axial length to the quick connector.

To overcome these problems and to provide an advancement in the quick connector art, the quick connect insertion indicator clip disclosed in U.S. Pat. No. 5,152,555, and assigned to the assignee of the present invention, was devised. This indicator clip includes a flag portion positioned externally of the quick connector and has members extending from the flag portion to embrace the female element of the quick connector. Engagement tabs extending from the members through registering apertures in the female element will contact an abutment surface formed on the male element upon fully coupling of the male and female components to enable removal of the indicator device as verification of complete or full coupling. When coupling is incomplete or not fully effected, the indicator device cannot be removed from the female component.

While the insertion indicator clip disclosed in U.S. Pat. No. 5,152,555 provides an easily visible indication of complete coupling of quick connector components, the quick connector still requires a separate retainer to lockingly couple the male and female components together.

U.S. Pat. No. 5,102,313 discloses a retainer clip having a centrally located slot for envelopingly engaging the radial flange on a male conduit when the male conduit is fully inserted into the female portion of a coupler. However, in this arrangement, if the clip is inserted into the housing axially ahead of the radial flange on the male conduit, the length of the male conduit between the flange and the forward tip end of the male conduit is sufficient to at least partially engage a seal mounted in the female housing. This could cause a subsequent leak since the male conduit, while appearing to be fully inserted into the female housing, is only partially engaged with the seal and, further, is not locked in a fixed portion in the female housing by the retainer clip.

To address these problems, a quick connector with a snap-on retainer disclosed in U.S. Pat. No. 5,542,716 was developed. This retainer is releasibly insertible into a transverse bore formed in female housing and includes an internal recess engageable with the radial flange on the male component only when the male component is fully coupled in an axial bore in the female component. The engagement between the recess and the radial flange permits full insertion of the retainer into the transverse bore and locks the male component and the female component together. The female component has opposed interior surfaces spaced sufficiently apart to permit the deflectable legs on the retainer to flex apart while they are being slidingly urged over the male component and to snap over the male component in the locked position. The opposed surfaces block full insertion of the retainer into the female component when the male component is not fully seated in the component. Lock projections on the retainer releasibly lock the retainer in a partially inserted, shipping position in the transverse bore in the female component.

This quick connector, as well as its subsequent improved counterparts, referenced above, meet the required functions of providing a visual indication of a sealed and locked connection between the male and female components, of providing an "avalanche effect" retainer clip, is releasible without special tools, and insures that the male component be fully inserted into the female component before the retainer can be urged into the latched position.

Thus, it would be desirable to provide a retainer for a quick connector which performs the functions of lockingly engaging the female and male components, providing a visual indication of a sealed and locked coupling between the male and female components, is releasable without special tools, requires that the male component be fully inserted before the retainer can be pushed into the latched position on the female component, provides an "avalanche effect" retainer clip while being provided in a retaining clip having a considerably shortened length as compared to previous quick connectors overall to enable the quick connector to be used in confined areas and to be manufactured at a lower cost due to the use of less material. Finally, it would be desirable to provide a retainer for a quick connector which can be installed in a temporary engaged position on the female component of the quick connector for shipment and subsequent use.

SUMMARY OF THE INVENTION

The present invention is a quick connector with a snap-on retainer means which provides releasible locking engagement of male and female components of the quick connector.

The present quick connector includes mating male and female components. The female component includes a housing having an axially extending bore terminating at an open end of the housing for receiving the male element therein. A transverse extending bore is formed in the housing in communication with the axially extending bore. The male component has a radially enlarged portion spaced from one end. A retainer means is slidable through the transverse bore in the housing only when the male component is fully coupled to the female component for releasably locking the male and female components together.

The retainer means comprises a body having an end wall and first and second spaced legs extending from the end wall. An extension projects from the end wall of the body of the retainer and has a frangible portion carried thereon. An aperture is formed in the frangible portion sized to slideably receive the first end of the male component therethrough, but blocking the radial flange on the male component when the retainer is in the partially inserted first position in the housing. Forced insertion of the male component separates the frangible portion from the retainer bodies thereby enabling the radial flange on the male component to be urged further into the bore in the female component. The retainer means may then be urged to the fully latched position sealingly locking the male and female components together as well as providing a visible indication of the full locked condition of the male and female components.

Means are also formed on the body for releasably locking the body in a partially inserted position in the transverse bore in the housing. Preferably, the releasably locking means comprises a projection formed on at least one and preferably both of the first and second legs. The projection(s) engage an outer surface of the housing.

The snap-on retainer of the present invention provides unique advantages when used in a quick connector. The retainer serves the multiple functions of lockingly engaging the male and female components of the quick connector, and providing a visual indication of complete and locked coupling of the male and female components. Further, the present retainer may be mounted in a partially inserted position on the female component of the quick connector for shipment and for ease of use after the male component has been inserted into the female component. Further, the present retainer requires that the male component be fully inserted into the female component before the retainer can be pushed into the fully latched position on the female component. The unique retainer of the present invention also has a minimal overall length thereby significantly reducing the overall length of the quick connector to enable a quick connector to be used in small, confined places where previous quick connectors could not be used. Finally, the smaller quick connector of the present invention utilizes less material which reduces its overall cost.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
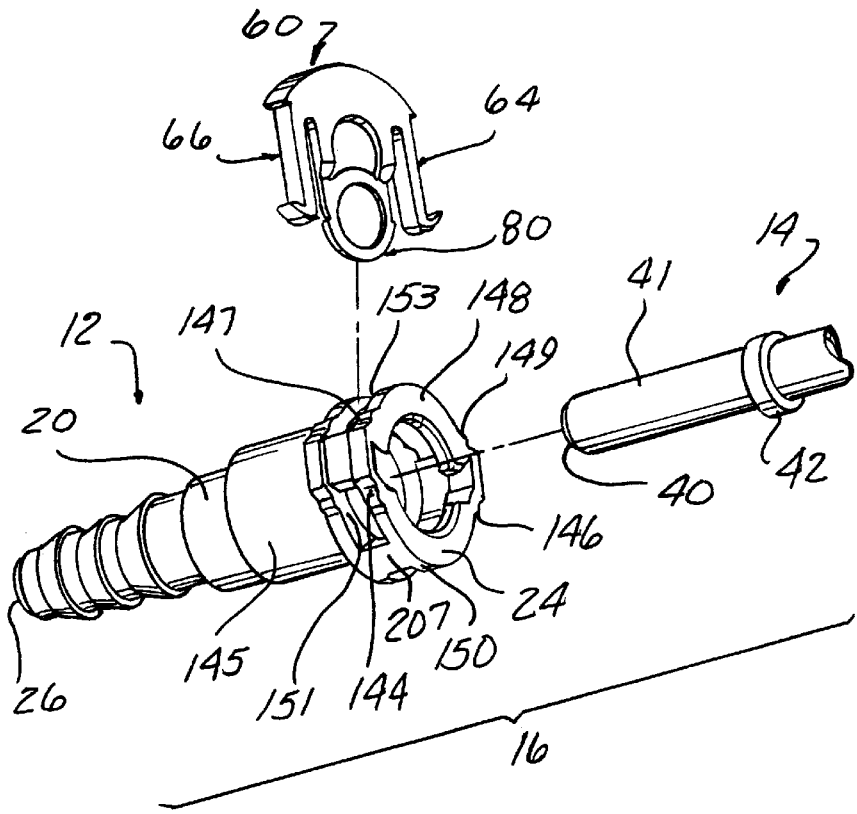
FIG. 1 is an exploded, perspective view of a quick connector with a snap-on retainer according to the present invention.

Referring now to FIGS. 1–7 of the drawing, there is depicted a snap-on retainer 60 which lockingly couples female and male components 12 and 14, respectively, of a quick connector 16.

The following description of the female connector component or element 12 is by way of example only as the female connector component 12 may have any suitable shape typically found in quick connectors.

Figure 5:
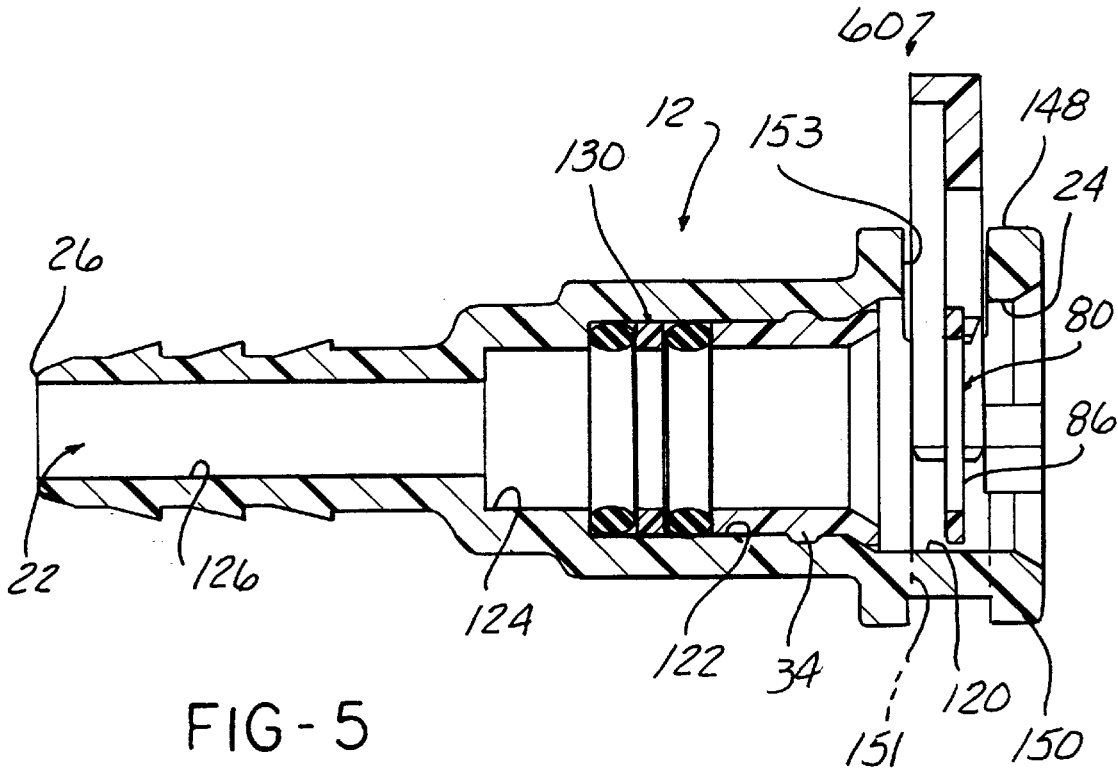
FIG. 5 is a cross sectional view generally taken along line 5—5 in FIG. 4.

The female component includes a housing 20 having an elongated, axially extending, internal stepped bore 22 extending from a large diameter first, open end 24 to a smaller diameter, second open end 26, as shown in detail in FIG. 5. The stepped bore 22 includes a first bore portion 120 extending from an opening at the first end 24 of the housing 20 to a second smaller diameter second stepped bore portion 122. A third yet smaller diameter stepped bore portion 124 extends axially from one end of the second stepped bore portion 122 and communicates to a still smaller fourth stepped bore portion 126 which extends to the open second end 26 of the housing 20.

As is conventional, a top hat or bearing 34 is mounted in the second stepped bore portion 122 immediately adjacent the end of the first bore portion 120. A seal means 130 is also mounted in the second stepped bore portion 122 between one end of the top hat 34 and the third stepped bore portion 124.

The inner diameter of the first stepped bore portion 120 is sized to slidably receive the outer diameter of the radially enlarged flange or upset bead 42 formed on the male component or fitting 14. Further, the inner diameters of the seal means 130 and the top hat 34 are sized to sealingly engage the outer diameter of the end portion 41 of the male component 14 extending from the radially enlarged flange 42 to the tip end 40 of the male component 14. The third stepped bore portion 124 has an inner diameter sized to snugly engage the outer diameter of the end portion 41 of the male component 14 when the male component 14 is fully inserted into the stepped bore 22 as described hereafter.

Figure 4:
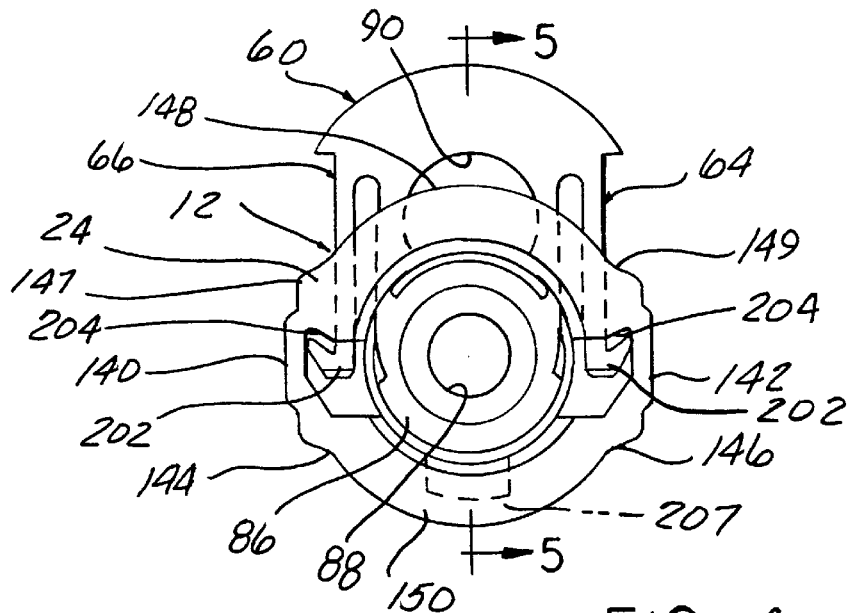
FIG. 4 is an end view of the quick connector and snap-on retainer shown in a partially inserted, storage position of the snap-on retainer.

As shown in FIG. 4. the first end 24 of the housing 12 is formed with a pair of opposed, exterior flats 140 and 142.

Figure 6:
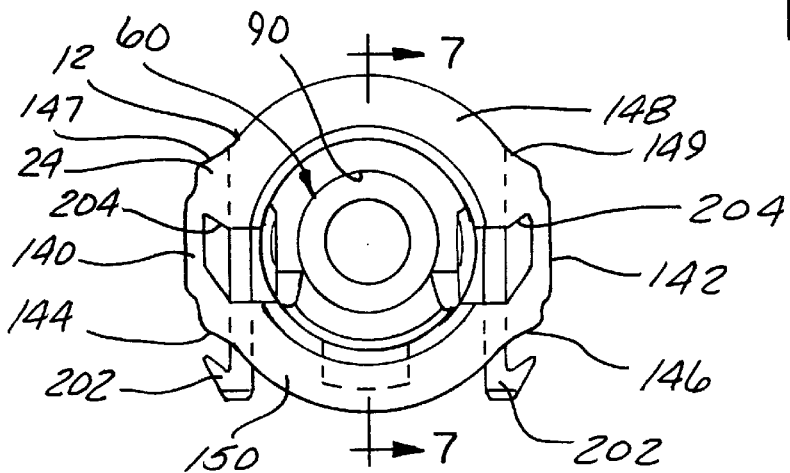
FIG. 6 is an end view of the quick connector and snap-on retainer with the male component depicted in a fully inserted, sealed position in the female component.

The flats 140 and 142 are diametrically opposed on the first end 24 and may be centrally located on each diametrical side of the first end 24. The adjacent surfaces of the housing 20 form an opposed pairs of lock surfaces or flats, such as a first flat 144 and a second flat 146. A second pair of flats 147 and 149 are formed on the other side of the flats 140 and 142. The flats 144 and 146 extend axially along the first end 24 of the housing 20 to a reduced diameter or necked-down portion 145 on the housing 20. The opposed surfaces 148 and 150 of the first end 24 of the housing 20 between the flats 144 and 146 and 147 and 149 have a generally arcuate shape as shown in FIGS. 1, 4 and 6. Apertures 153 and 151 are formed respectively in each surface 148 and 150. The apertures 153 and 151 are aligned to form a bore extending through the first end 24 of the housing 20 and disposed in communication with the first bore 120 in the housing 20.

The retainer 60, shown in FIGS. 1–7, is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72; although the ends 72 could be connected together by an arcuate piece.

A pair of projections 202 extend along the length of the retainer 60 between opposed side edges of the side legs 64 and 66, respectively. The projections 202 are located adjacent the outer end of each leg 64 and 66. The projections 202 engage surfaces with the housing 12 to position the retainer 60 in the shipping position shown in FIGS. 4 and 5, or in the fully inserted, latched position shown in FIGS. 6 and 7.

Further, a pair of grip tabs or edges 206 are formed adjacent the end wall 62 on each side leg 64 and 66. The grip tabs 206 extend outward from adjacent portion of the first end 24 the housing 12 when the retainer 60 is fully inserted in the housing 12 and enable the retainer 60 to be easily grasped for separation from the housing 12.

Figure 2:
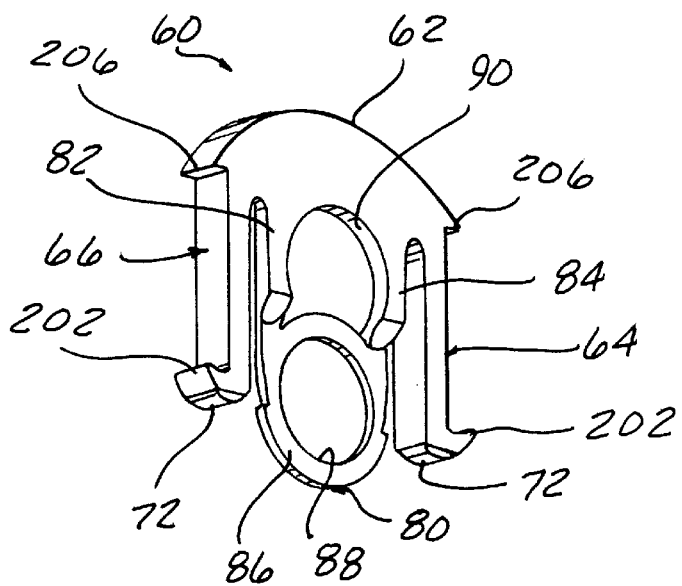
FIG. 2 is an enlarged, perspective view of the snap-on retainer shown in FIG. 1.
Figure 3:
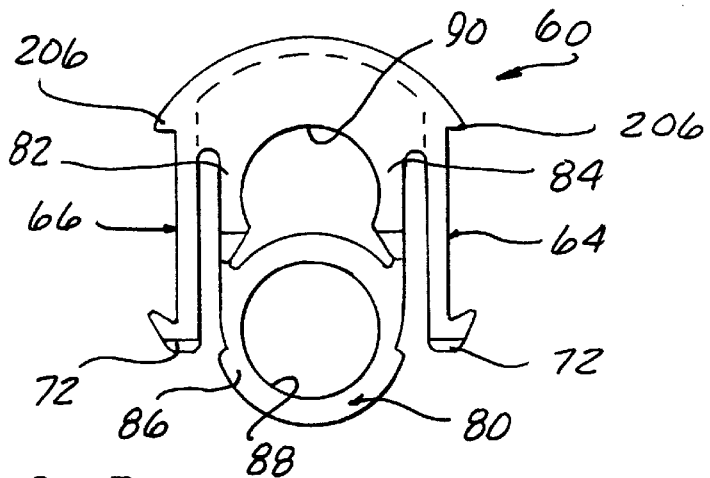
FIG. 3 is an end view of the snap-on retainer shown in FIGS. 1 and 2.

An extension denoted by reference number 80 is integrally formed on the retainer 60 and projects from the end wall 62 between the sidewalls 64 and 66. The extension 80 has a small thickness as compared to the larger thickness or length of the sidewalls 64 and 66. Further, the extension 80 is preferably located along one side edge of the retainer 60 as shown in FIGS. 1 and 2. The extension, by example only, is formed of a pair of legs 82 and 84 extending in parallel from the end wall 62. A continuous ring 86 joins the ends of the legs 82 and 84. An aperture 88 is formed in the ring 86. Another aperture 90 is formed between the legs 82 and 84 and the ring 88 primarily for weight and material reduction.

The inner diameter of the ring 86 is at least as large as the diameter of the end 41 on the male component 14; but smaller than the O.D. of the flange 42 on the male connector 14. In this manner, the ring 86 will allow the end 41 to pass into the female component 12; but will block the annular flange 42.

The retainer 60 can be first be installed on the housing 12 in a shipping or storage position as shown in FIGS. 4 and 5. In this position, the ring 86 on the retainer fills and blocks a substantial portion of the opening of the bore 120 in the first end 24 of the housing 12. In addition, the projections 202 on the side legs 64 and 66 of the retainer 60 snap into and engage longitudinally extending grooves 204 extending internally from the first end 24 of the housing 12.

Figure 7:
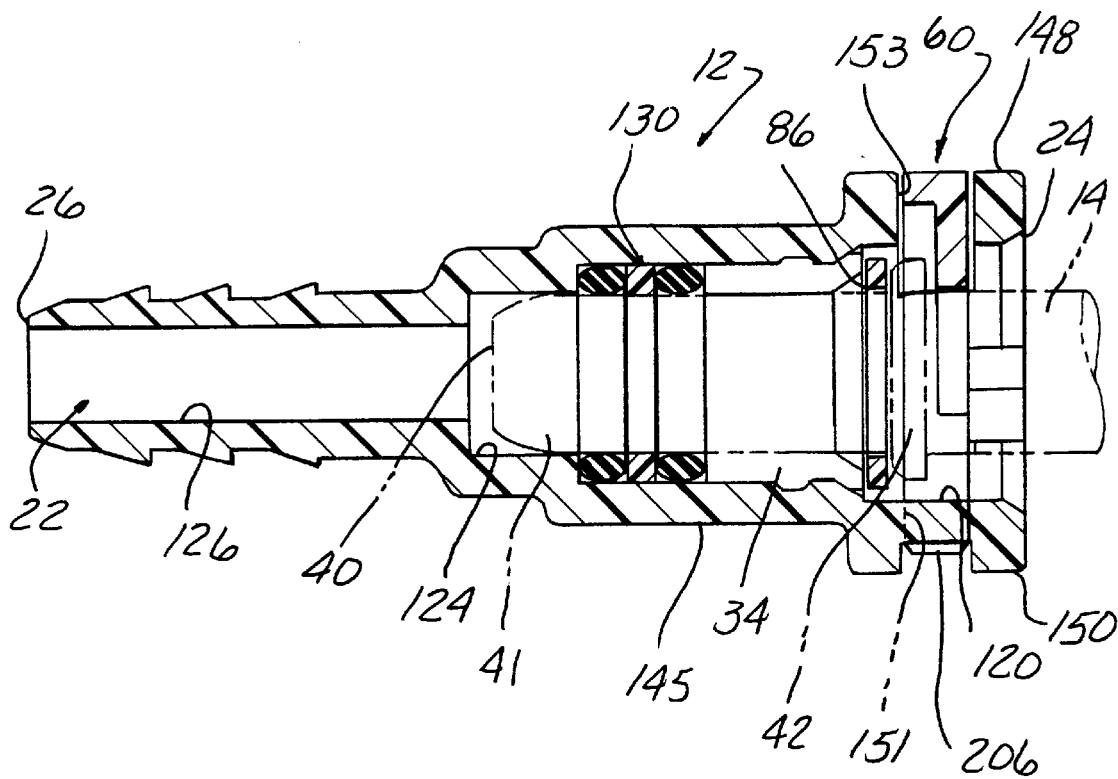
FIG. 7 is a cross sectional view generally taken along line 7—7 in FIG. 6.

Further insertion of the retainer 60 through the aligned apertures 153 and 151 in the housing 12 is prevented by a thin tab 207, shown in FIG. 4, extending axially across the aperture 151 in the housing 12. However, the ring 86 on the retainer 60 when contacting the tab 207 blocks any insertion of the flange 42 of the male component 14 into the housing 12 unless a prerequisite amount of force is applied to the male component 14 to break and separate the ring 86 from the legs 82 and 84 on the extension 80. Once the ring 86 has been broken or separated from the remainder of the extension 80 and retainer 60, the raised flange 42 on the male component 14 slides the freely movable and separated ring 86 into engagement with one end of the top hat 34 shown in FIG. 7. The first end 41 of the male component 14 continues to slide into the bore in the female component 12 until it is fully inserted and sealed in the bore 124 in the housing 12 as shown in FIG. 7.

In this fully inserted position of the male component 14 in the female component 12, the annular flange 42 on the male component 14 is situated behind the legs 82 and 84 on the retainer 60. The retainer 60 may then be forcibly urged completely into the housing 12 until the projections 202 on the legs 64 and 66 pass through the aperture 151 and engage the flats or lock surfaces 144 and 146 on the housing 12 as shown in FIG. 6. This position represents the fully latched position in which the male component 14 is fully seated in and lockingly engaged with the female component 12. The full insertion of the retainer 60 also provides visible indication of the fully locked connection of the male and female components.

When it is desired to separate the male and female components 14 and 12, the grip tabs 206 are grasped and the retainer 60 urged outward from the apertures 153 and 151 in the housing 12 until the legs 82 and 84 clear the outer diameter of the annular flange 42 on the male component 14. The female component 12 may then be separated from the male component 14.

In summary, there has been disclosed a unique frangible snap-on retainer for a quick connector which enables the overall length of the quick connector to be substantially reduced thereby lowering the cost and reducing the weight of the entire quick connector. The frangible snap-on retainer of the present invention also provides the required functions of a visible indication of a sealed and locked connection between the male and female connector components, is releasable without the use of special tools, and insures that the male component be fully inserted before the retainer can be pushed into the fully latched position.

What is claimed is:

1. A quick connector comprising:

mating male and female components;

the male component having a first end portion terminating in a tip end and a radially enlarged flange spaced from the tip end;

the female component including a housing having an axially extending stepped bore formed of at least a first bore portion disposed adjacent to an open end at a first end of the housing for receiving the male component therein;

a pair of opposed, aligned apertures formed in the housing in transverse communication with the first bore of the axially extending bore;

retainer means, slidable through the pair of apertures in the housing, for releasibly locking the male and female components together, the retainer means including:

a body having an end wall and first and second spaced legs extending from the end wall; and an extension carried on the body, the extension projecting from the body of the retainer means and disposed between the first and second spaced legs of the body, the extension including frangible block means for blocking the passage of the male component completely into the bore in the female component when retainer means is in a first inserted position in the pair of apertures in the housing and permitting full insertion of the male component into the bore in the housing after separation from the body; and means, carried on the housing, for preventing movement of the retainer means from the first position to the second position as long as the frangible block means is attached to the extension.

2. The quick connector of claim 1 further comprising:

an aperture formed in the frangible portion, the aperture having a diameter permitting passage of the first end portion of the male component therethrough, but blocking the radially enlarged flange on the male component.

3. The quick connector of claim 1 further comprising:

an aperture formed in the frangible portion, the aperture having a diameter greater than a diameter of the first end of the male component and smaller than a diameter of the flange on the male component.

4. The quick connector of claim 1 wherein the block means further comprises:

at least one leg extending from the end of the body and integrally formed with the frangible portion.

5. The quick connector of claim 1 wherein the movement preventing means comprises:

a tab carried on the housing and extending across one of the pair of aligned apertures in the housing, the tab engaging the frangible block means of the retainer means when the retainer means is inserted into the housing.

6. The quick connector of claim 1 further comprising:

locking means, formed on one of the first and second side legs of the body of the retainer means, for releasibly locking the body in at least one of a partially inserted position through the first and second apertures in the housing and a fully inserted position wherein the outer ends of the first and second legs extend through the pair of apertures and outward from the housing.

7. The quick connector of claim 6 wherein the housing comprises:

at least one groove extending axially from the open first end of the housing along the first bore portion of the axially extending bore.

8. The quick connector of claim 7 wherein the locking means comprises:

at least one projection formed on one of the first and second side edges of one of the first and second legs and releasably engageable with the at least one groove in the housing to lock the retainer in a partially inserted position in the housing.

9. The quick connector of claim 8 wherein the locking means comprises:

a projection formed on each of the first and second side edges of each of the first and second legs of the body of the retainer.

10. The quick connector of claim 7 wherein the locking means comprises:

a projection formed on at least one of the first and second side legs of the body of the retainer and extending perpendicularly from an exterior surface of the one side leg to releasibly engage the at least one groove in the housing to lock the retainer in a partially inserted position in the housing.

11. The quick connector of claim 6 further comprising:

at least one lock surface formed exteriorly on the housing of the female component, the at least one lock surface engaged by the locking means when the retainer is inserted through the pair of apertures in the housing.

12. The quick connector of claim 11 wherein the at least one lock surface comprises:

a flat formed exteriorly on the housing.

13. The quick connector of claim 11 further comprising:

a first pair of planarly aligned lock surfaces disposed on opposite sides of the housing.

14. The quick connector of claim 13 further comprising:

a second pair of planarly aligned lock surfaces disposed on opposite sides of the housing and spaced from the first pair of lock surfaces.

15. The quick connector of claim 1 further comprising:

grip tabs formed adjacent the end wall of the body of the retainer and projecting outward from the first and second side legs of the body of the retainer.

16. A quick connector comprising:

mating male and female components;

the male component having a first end portion terminating in a tip end and a radially enlarged flange spaced from the tip end;

the female component including a housing having an axially extending stepped bore formed of at least a first bore portion disposed adjacent to an open end at a first end of the housing for receiving the male component therein;

a pair of opposed, aligned apertures formed in the housing in transverse communication with the first bore of the axially extending bore;

retainer means, slidable through the pair of apertures in the housing between a first partially inserted position and a second fully inserted position, for releasibly locking the male and female components together, the retainer means including:

a body having an end wall and first and second spaced legs extending from the end wall;

at least one leg extending from the end wall between the first and second legs;

a frangible portion frangibly connected to the leg;

an aperture formed in the frangible portion, the aperture having a diameter permitting passage of the first end portion of the male component therethrough, but blocking the radially enlarged flange on the male component when the retainer means is in the first position, and wherein;

the frangible portion is separable from the leg upon forced insertion of the male component into the female component and movable to a position in the stepped bore enabling full insertion of the male component and permitting insertion of the retainer means to the fully inserted second position locking the male and female components together.

* * * * *